US012375513B2

(12) United States Patent
Caselden et al.

(10) Patent No.: US 12,375,513 B2
(45) Date of Patent: Jul. 29, 2025

(54) SYSTEMS AND METHODS FOR DETECTING COMPLEX ATTACKS IN A COMPUTER NETWORK

(71) Applicant: Fortinet, Inc., Sunnyvale, CA (US)

(72) Inventors: Dan Caselden, South Hamilton, MA (US); John Conwell, Tukwila, WA (US); Lindsey Lack, Tucson (UZ); Michael Lin, Ottawa (CA); Kevin Graves, Gambrills, MD (US)

(73) Assignee: Fortinet, Inc., Sunnyvale, CA (US)

( * ) Notice: Subject to any disclaimer, the term of this patent is extended or adjusted under 35 U.S.C. 154(b) by 212 days.

(21) Appl. No.: 18/208,364

(22) Filed: Jun. 12, 2023

(65) Prior Publication Data

US 2024/0333740 A1    Oct. 3, 2024

Related U.S. Application Data

(63) Continuation of application No. 18/129,208, filed on Mar. 31, 2023.

(51) Int. Cl.
*H04L 29/06* (2006.01)
*H04L 9/40* (2022.01)

(52) U.S. Cl.
CPC ...... *H04L 63/1425* (2013.01); *H04L 63/1416* (2013.01)

(58) Field of Classification Search
CPC .......... H04L 63/1425; H04L 63/1416
See application file for complete search history.

(56) References Cited

U.S. PATENT DOCUMENTS

| | | |
|---|---|---|
| 6,484,203 B1 | 11/2002 | Porras et al. |
| 10,019,338 B1 | 7/2018 | Goradia et al. |
| 2018/0227324 A1 | 8/2018 | Chambers et al. |
| 2019/0334948 A1* | 10/2019 | Jiang .................. H04L 69/22 |
| 2021/0168162 A1* | 6/2021 | Ahn .................. H04L 63/1425 |
| 2021/0303682 A1 | 9/2021 | Mugambi et al. |
| 2023/0095870 A1 | 3/2023 | Du |

OTHER PUBLICATIONS

Guo You, et al. "Mitigating Webshell Attacks through Machine Learning Techniques." MDPI. Published Jan. 14, 2020. 16 pages.* Jan. 2020.*

Lack et al., "Web Shell Case Study", Applied Threat Research, Gigamon Threat Insight, 2017-2022, 24 pages.

Office Action for U.S. Appl. No. 18/129,208 mailed Feb. 21, 2025, 12 pages.

* cited by examiner

Primary Examiner — Jason K Gee

(74) Attorney, Agent, or Firm — Jaffery Watson Hamilton & DeSanctis LLP

(57) ABSTRACT

Various embodiments provide systems and methods for identifying malicious network behavior based upon historical analysis.

23 Claims, 12 Drawing Sheets

SYSTEMS AND METHODS FOR DETECTING COMPLEX ATTACKS IN A COMPUTER NETWORK

RELATED APPLICATIONS

This application is a continuation of U.S. patent application Ser. No. 18/129,208, filed Mar. 31, 2023, and entitled "SYSTEMS AND METHODS FOR VISUALIZING DETECTED ATTACKS IN A COMPUTER NETWORK" by Graves et al. The entirety of the aforementioned application is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright @ 2023, Fortinet, Inc.

FIELD

Embodiments discussed generally relate to systems and methods for detecting malicious computer activity, and more particularly to systems and methods for identifying malicious network behavior based upon historical analysis.

BACKGROUND

Computers and computer networks are subject to a number of different types of attacks leading to development of machines and software to mitigate and in some cases prevent such attacks. The mechanisms used for such mitigation and prevention, however, have proven ineffective for some complex types of attacks.

Accordingly, there is a need in the art for advanced systems and methods for detecting computer and network attacks.

SUMMARY

Various embodiments provide systems and methods for identifying malicious network behavior based upon historical analysis.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
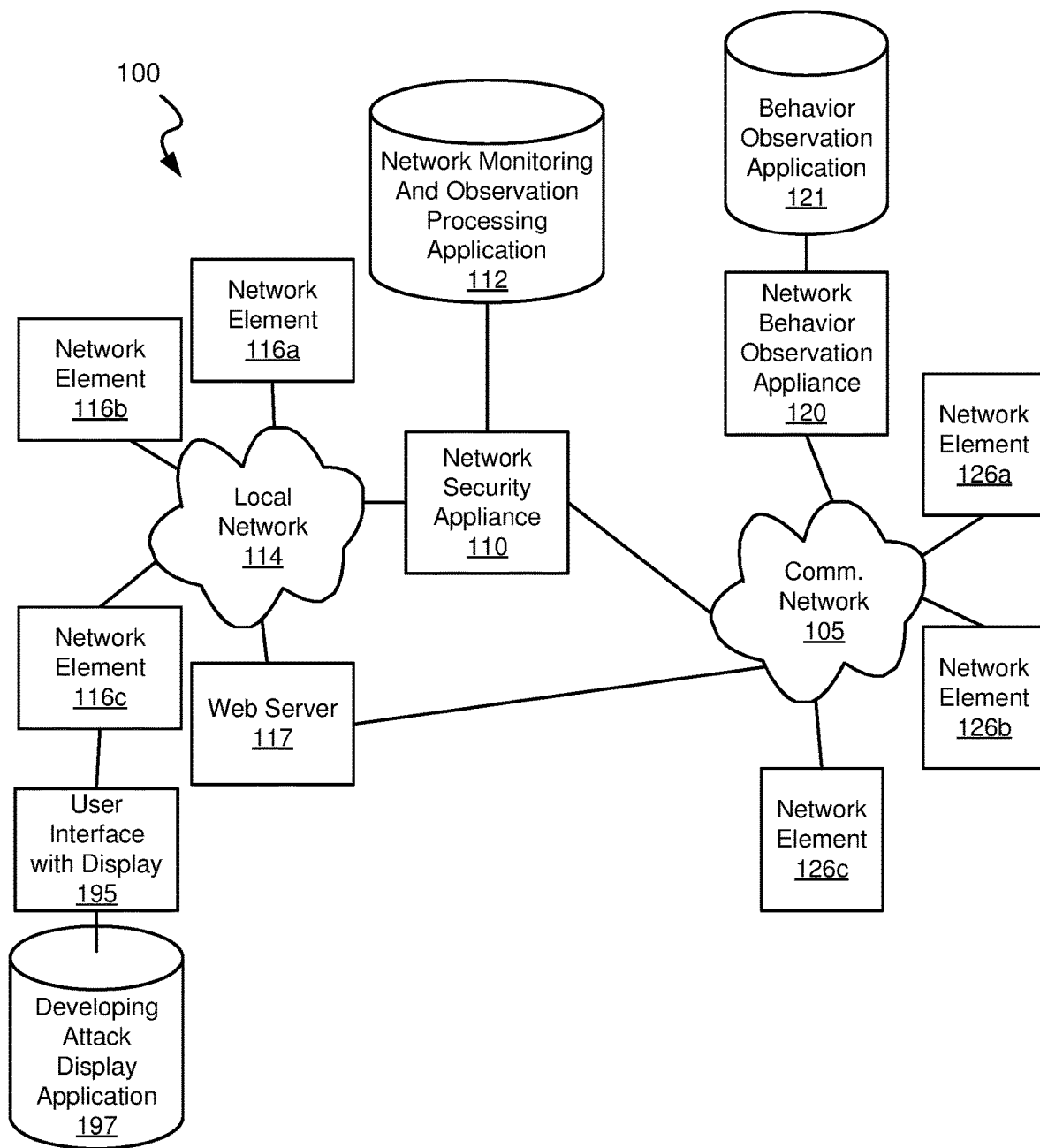
FIGS. 1A-1E illustrate a network architecture including a network behavior observation appliance configured to detect complex attacks using historical data derived from monitoring a local network by a network security appliance in accordance with some embodiments.

Various embodiments provide systems and methods for identifying malicious network behavior based upon historical analysis.

Some embodiments discussed herein provide effective systems and/or methods for detecting complex attacks using historical analysis. Such complex attacks may include, but are not limited to, webshell based attacks. For a typical webshell, an attacker will upload a "php" (or other scriptable) file on a webserver that is the webshell. The addition of this file creates a new path to which the legitimate webserver will respond. The attacker then interacts with the webshell by sending it HTTP requests via a unique path, which the webshell translates into commands that it executes on the webserver. Results are provided to the attacker by HTTP responses.

Using such a webshell technique, an attacker effectively gains command-line access to the webserver. Because the attacker in many cases can vary the client used for this access, and because the traffic is to a legitimate webserver that in most cases uses standard web protocols, a traditional shallow signature-based method is ill equipped to effectively detect this class of attack. Part of the reason such traditional methods are ineffective is their inability to meaningfully consider the history of the paths that have been seen in association with the webserver. If a history is not maintained, then the identification that a new path is being used would not be known. The fact that a new path is being used is not sufficient to identify a webshell by itself, and using new path identification alone leads to an unacceptable level of false positives. While the identification of a new path alone does not indicate the presence of a webshell, the identification of such a new path is one component of an effective detection. Some embodiments discussed herein provide a cost-effective and computer implementable method for maintaining and processing historical information. As such, the embodiments can be used effectively in detecting and mitigating webshell attacks.

It has been found that traditional network detection methods must rely on either instantaneous identification of malicious activity or the use of very shallow aggregation of data because of an inability to access stateful information. This inability to access stateful information is in part due to a lack of technology surrounding access to stateful information and computationally practical use of such information.

Further, such traditional network detection methods often rely mainly on matching the exact pattern of characters in a packet or a stream that indicate that the traffic is malicious. The grammar of the rules for, for example, Snort™ or Suricata™ reflects the limitations of these intrusion detection systems. Rules are by default constructed as a conjunctive statement: a series of terms that must all be true for the rules to fire. While Snort™ and Suricata™ can perform some stateful analysis using flow bits or some limited detection of scanning behavior, these special cases are not very expressive and are not capable of capturing more complex behaviors or patterns. Because network traffic is often high-volume and high-velocity, with large amounts of data flowing across the network at any given time, it is impractical for traditional network detection methods to develop and utilize a rich body of stateful information. This is further exacerbated by the need of an intrusion detection system (IDS) to analyze high-volume, high-velocity traffic in real-time, and quickly identify any malicious activity. This requires a system that is both fast and efficient, and can process large volumes of data with minimal overhead. The grammar of the rules for Snort™ and Suricata™ is designed to meet these performance requirements by focusing on matching patterns within a limited time window, and as such the processes of such traditional network detection methods are inherently incapable of dealing with many complex network attacks.

"Known-good" comparison and unexpected network flows involves maintaining a "golden image" for all web application infrastructure and identify any activity that deviates from this known good behavior. This assumes that the expected network activity is known ahead of time, both the structure of every web application and the collection of valid webservers. To do this effectively would require a web application team that is closely synchronized with the security team, web infrastructure that rarely changes, and well implemented controls around the use of externally facing webservers in the environment. Some embodiments discussed herein that rely on the history of the network activity as a basis for detecting complex attacks avoid the need for close synchronization of a web application team and a security team.

Endpoint tools provide direct access to internal hosts and allow for a couple of approaches that leverage endpoint access. One approach is to identify artifacts of common webshells (e.g., filenames) using a search tool like YARA™. Such an approach offers some level of success in identifying webshells, but it prone to an unacceptably high rate of false positives. Another approach is to leverage existing logic that might be available in an Endpoint Detection and Response (EDR) tool or use host auditing software (such as Sysmon™ or Auditd™) combined with custom logic. This approach usually relies on attackers using suspicious applications that are ultimately launched by a webserver. Some embodiments discussed herein that rely on the history of the network activity as a basis for detecting complex attacks do not involve the burden of endpoint management or the potential false negatives that may occur if the endpoint system has incomplete coverage.

Signature-based detection is effective for detecting a small set of webshells for which signatures are known and available. Such an approach only works where: an attacker uses one of a small number of webshells with a known signature, and neglects to change the webshell to avoid detection. As changing a webshell to avoid detection is a simple change, the effectiveness of signature-based detection is very limited. Some embodiments discussed herein that rely on the history of the network activity as a basis for detecting complex attacks do not rely on detecting signatures and as such do not suffer from the degree of false negatives that are expected due to incomplete coverage in a signature-based detection system.

Detecting anomalous requests uses webserver logs to identify anomalous activity. Such systems provide a grab-bag of suggestions about what to look for in the data that might be associated with webshell activity. Some of the conventional specifics are: user agent strings in the HTTP headers that are uncommon on the target network, missing referring entity field values in the web requests, unusual IP addresses for a given application, paths (i.e., uniform resource identifiers (URIs)) with few user agents or IP addresses. These are effectively analytic suggestions that raise questions in isolation, and often with the caveat that each is likely to produce significant false positives in many environments and should only be one part of a broader defense-in-depth approach. It is sometimes suggested that these analytic ideas could be implemented in, for example, Splunk™ or via scripting. These suggestions, however, imply that there is some historical context being kept (e.g., "unusual", "uncommon"); however, for example, Splunk™ does not provide for collecting rich historical data over time, calculating whether something is unusual or unique, and reusing this condensed information in new queries. In principle, our system implements suggestions similar to the conventional approaches identified above. In stark contrast, some embodiments discussed herein uses multiple features derived from historical information to train a machine learning model that looks at the combination of features. Additionally, some embodiments are able to make use of metadata that has been extracted from the raw logs, both for the present period and historic periods, and further uses dependency calculations to ensure the ordering of extractions, allowing for arbitrarily complicated extraction of data.

Various embodiments provided herein allow for the maintenance and computational use of such stateful information without a substantial increase of storage and/or computational capability when compared with traditional network detection methods. As such, complex attacks previously undetectable by traditional network detection methods are made possible on similar hardware. Some such embodiments that provide an ability to detect and/or mitigate webshell attacks rely upon: systems and/or methods for collection of historical attributes and context, systems and/or methods for rendering such historical attributes and context into reusable and storage-limited intermediates, systems and methods for translating the intermediates into features relevant to defined detection problems, and/or systems and methods including machine learning models where each is configured to perform effective decision making on a respective detection problem.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/ gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The term "intermediate" or "intermediates" when used as a noun are used in their broadest sense to mean any data generated from inputs where the data generated is both: (1) much smaller in storage size than the inputs from which it was generated, and (2) expected to be maintained after the inputs have been discarded. In some cases, an intermediate can created at least in part based upon other intermediates. Based upon the disclosure provided herein, one of ordinary skill in the art will recognize a variety of intermediates that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide systems for displaying information about complex network attacks. Such systems include: a processing resource, a display device communicably coupled to the processing resource, and a non-transitory computer-readable medium coupled to the processing resource. The non-transitory computer-readable medium having stored therein instructions that when executed by the processing resource cause the processing resource to: at a first time, receive an indication of a detected attack and a first node impacted by the detected attack; generate a first static display image showing at least a first interrelationship between the detected attack and the first node; at a second time, identify a second node impacted by the detected attack; generate a second static display image showing at least a second interrelationship between the detected attack and the second node; receive a request to display an evolution of the detected attack; and display at least one of the first static display and the second static display by the display device.

In some instances of the aforementioned embodiments, the non-transitory computer-readable medium further having stored therein instructions that when executed by the processing resource cause the processing resource to: identify an authorization event occurring in a communication network that includes the first node, where the authorization event includes a user name; identify a time relationship between the authorization event and the first time; and deduce from the time relationship that the user name is associated with the first node. In some such instances, displaying the at least one of the first static display and the second static display by the display device includes displaying the user name in relation to the first node.

In various instances of the aforementioned embodiments where the second time is after the first time and the second node was impacted by the detected attack before the first node was impacted by the detected attack, generating the first static display image includes generating the first static display image showing both the first interrelationship and the second interrelationship. In such instances, displaying the at least one of the first static display and the second static display by the display device includes displaying both the first static display and the second static display in a video series with the second static display preceding the first static display in the video series.

In some instances of the aforementioned embodiments where the second time is after the first time and the second node was impacted by the detected attack after the first node was impacted by the detected attack, generating the second static display image includes generating the second static display image showing both the first interrelationship and the second interrelationship. In such instances, displaying the at least one of the first static display and the second static display by the display device includes displaying both the first static display and the second static display in a video series with the first static display preceding the second static display in the video series.

In various instances of the aforementioned embodiments where the second time is after the first time and the detected attack is a first detected attack, the non-transitory computer-readable medium further having stored therein instructions that when executed by the processing resource cause the processing resource to: at a third time, identify a second detected attack impacting the second node, where the third time is after the second time, and where the second node was impacted by the second detected attack before the second node was impacted by the first detected attack; and generate a third static display image showing at least a third interrelationship between the second detected attack and the second node. In some such cases, displaying the at least one of the first static display and the second static display by the display device includes: displaying the third static display, the second static display, and the first static display in the video series with the third static display before the second static display, and the second static display before the first static display.

Other embodiments provide methods for displaying information about complex network attacks. The methods include: at a first time, receiving, by a processing resource, an indication of a detected attack and a first node impacted by the detected attack; generating, by the processing resource, a first static display image showing at least a first interrelationship between the detected attack and the first node; at a second time, identifying, by the processing resource, a second node impacted by the detected attack; generating, by the processing resource, a second static display image showing at least a second interrelationship between the detected attack and the second node; receiving, by the processing resource, a request to display an evolution of the detected attack; and displaying, by the processing resource, at least one of the first static display and the second static display by the display device.

Yet other embodiments provide non-transitory computer-readable media having stored therein instructions that when executed by a processing resource cause the processing resource to perform a method comprising: at a first time, receiving an indication of a detected attack and a first node impacted by the detected attack; generating a first static display image showing at least a first interrelationship between the detected attack and the first node; at a second time, identifying a second node impacted by the detected attack; generating a second static display image showing at least a second interrelationship between the detected attack and the second node; receiving a request to display an evolution of the detected attack; and displaying at least one of the first static display and the second static display by the display device.

Turning to FIG. 1A, network architecture 100 is shown that includes a network behavior observation appliance 120 configured to detect complex attacks using historical data derived from monitoring a local network 114 by a network security appliance 110 in accordance with some embodiments. Network security appliance 110 executes a network monitoring and observation processing application 112 to provide a sensor log to network behavior observation appliance 120, and to process network observations from network behavior observation appliance 120. Network behavior observation appliance 120 executes a behavior observation application 121 to generate network observations based at least in part on the sensor log from network security appliance 110.

In the context of network architecture 100, a number of network elements (e.g., a network element 116a, a network element 116b, a network element 116c, a network element 126a, and a network element 126b) are coupled to respective networks (e.g., local network 114 and a communication network 105). Local network 114 and communication network 105 may respectively be any type of communication network known in the art. Those skilled in the art will appreciate that, local network 114 and/or communication network 105 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

A webserver 117 is accessible at the edge of local network 114 and provides access to various data. Various elements coupled to local network 114 are susceptible to complex attacks that are difficult if not impossible to detect using traditional network detection methods known in the art. Due to its location at the edge of local network 114 and its expected operation, webserver 117 is particularly susceptible to complex attacks, such as, a webshell based attack where an attacker will create a new path to which an existing, legitimate webserver will respond. When scripting is enabled on the webserver, an attacker may upload a "php" (or other scriptable) file on a webserver that is the webshell. The attacker then interacts with the webshell by sending it HTTP requests via a unique path, which the webshell translates into commands that it executes on the webserver. In this embodiment, such complex attacks are monitored by network behavior observation appliance 120 based upon a continuously updated sensor log available from network security appliance. Relevant observations of complex attacks are forwarded to network security appliance 110 for further processing.

Some embodiments further include a user interface with display 195 configure to executing a developing attack display application 197. User interface with display 195 may be any machine or portion thereof capable of receiving attack information and displaying the attack information to a user in a way that allows the user to see the attack develop over time.

Developing attack display application is executable by a processor of the user interface with display to perform one or more of the processes described below in relation to FIGS. 4-

Figure 1B:
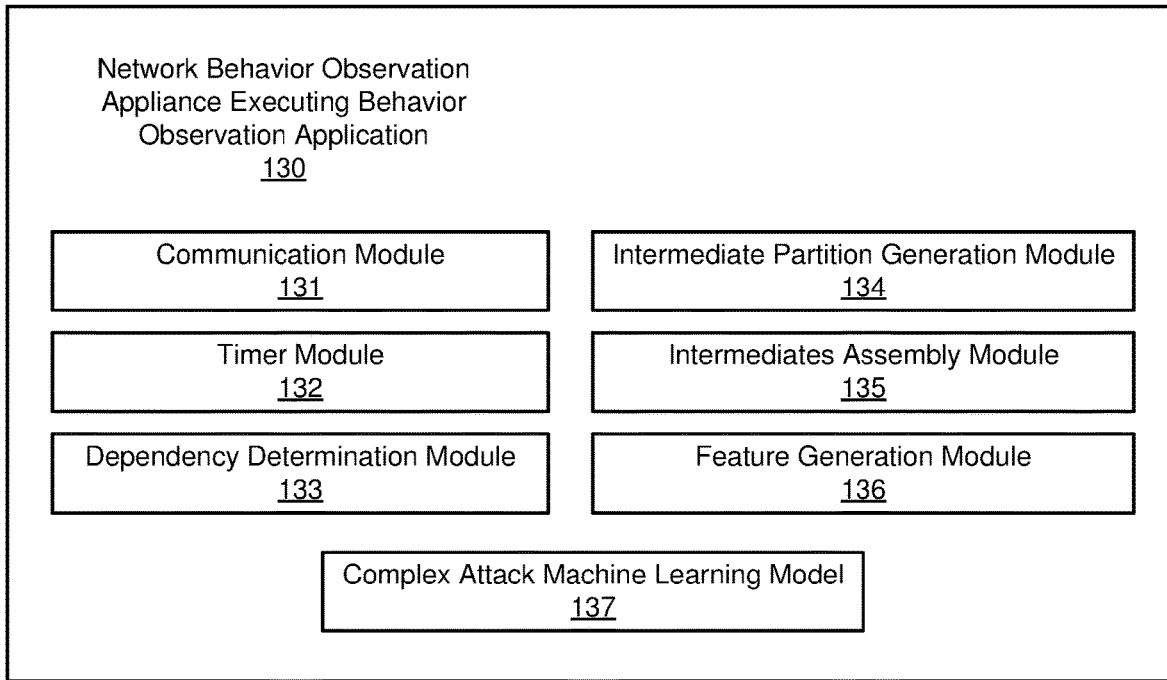

Turning to FIG. 1B, an example implementation of a network behavior observation appliance executing a behavior observation application 130 (e.g., network behavior observation appliance 120 executing behavior observation application 121) is shown in accordance with some embodiments. As shown in this example, network behavior observation appliance executing a behavior observation application 130 includes: a communication module 131, a timer module 132, a dependency determination module 133, an intermediate partition generation module 134, an intermediates assembly module 135, a feature generation module 136, and a complex attack machine learning model.

Communication module 131 is configured to access a sensor log generated by a network element remote from the network behavior observation appliance, access context data related to the data in the sensor log from sources other than the network element, and to communicate observations generated by the network behavior observation appliance to the network element or other designated recipient.

Timer module 132 is configured to indicate periods of time (i.e., a partition time) when an intermediate partition is to be generated. The partition time is a time period that defines the data from the sensor log that will be processed into intermediates. Thus, as an example, a partition time may be two (2) hours, and in such a case where the partition time began at noon on a particular data all data in the sensor log gathered between noon and two (2) pm on the particular data are processed together in the same partition. In other embodiments, a partition time is one (1) hour. The larger the partition time, the larger the amount of data from the sensor log that will be represented by the intermediates generated by processing the data in the sensor log and the greater the amount of processing bandwidth needed to generate the intermediates. Based upon the disclosure provided herein, one of ordinary skill in the art will appreciate different partition times that may be used in relation to different embodiments.

Dependency determination module 133 is configured to access one or more intermediates generation rules that each include a recipe for generating the various intermediates that are desired including, inputs to be used in generating a particular intermediate, dependencies between different inputs to the given intermediate, and the series of processes to be done in order to generate the given analytic based upon the different inputs. Based upon the information about the dependencies between different inputs to the given intermediate, dependency determination module 133 determines whether all of the components indicated in the dependencies are available.

Intermediate partition generation module 134 is configured to orchestrate a series of processes or defined analytic tasks that are performed on the processing partition to generate the particular intermediate. The defined analytic tasks may be any analytic needed to generate the desired intermediate from the processing partition. Thus, as an example where the intermediate is the number of times the same request occurred in the partition time, the defined analytic may rely only on request and response sizes in the processing and count each of the identical size values to yield the particular intermediate.

Intermediates assembly module 135 is configured to incorporate the newly generated intermediate (i.e., the current intermediate) as a partition into an existing intermediate that has a number of other partitions each corresponding to a respective partition time. Each of the partitions in a given intermediate include the same data for different partition periods.

Feature generation module 136 is configured to derive features (i.e., inputs for a complex attack machine learning model) from one or more partitions of one or more existing intermediates. For example, where a machine learning model is trained to detect a particular type of complex attack, the features derived from the various intermediates are the inputs to the machine learning model. In some embodiments, the intermediates are designed to be inputs to the particular machine learning model. In other embodiments, the inputs for the particular machine learning model must be derived from one or more intermediates. It is noted that several machine learning models may use inputs derived from subsets of the available intermediates with each of the machine learning models configured for a respective objective.

Complex attack machine learning model is configured to generate observations based upon the aforementioned features where the observations indicate a likelihood that a complex attack for which the complex attack machine learning model occurred.

Figure 1C:
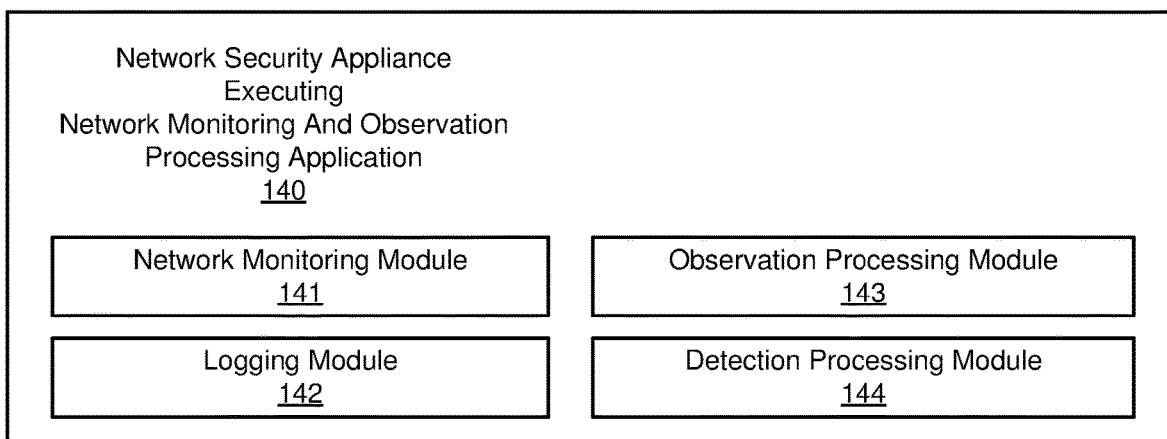

Turning to FIG. 1C, an example implementation of a network security appliance executing a network monitoring and observation processing application 140 (e.g., network security appliance 110 executing network monitoring and observation processing application 112) is shown in accordance with some embodiments. As shown in this example, network security appliance executing a network monitoring and observation processing application 140 includes: a network monitoring module 141, a logging module 142, an observation processing module 143, and a detection processing module 144.

Network monitoring module 141 is configured to captured attributes of received network traffic. In some embodiments, the network traffic monitoring is performed using a commercially available Zeek™ network security monitor that allows for logging thousands of distinct network occurrences and formatting the data into user defined log files. Based upon the disclosure provided herein, one of ordinary skill in the art will recognize a large variety of network occurrences that may be incorporated into the aforementioned sensor log.

Logging module 142 is configured to store the aforementioned captured attributes of the received network traffic to a sensor log that maintains all captured information for a limited period of time. In some embodiments, the sensor log is a first-in, first-out memory structure that maintains captured attributes corresponding to the most recently received network traffic.

Observation processing module 143 is configured to receive an observation from a network behavior observation appliance, and detection processing module 144 is configured to generate an indication of whether a complex attack has been detected based at least in part on the received observation. This involves converting the received observation which may include any number of user definable processes that use one or more network observations to, where appropriate, indicate a malicious attack was detected. In some embodiments, the conversion may be as simple as indicating a malicious attack was detected and including the information about the attack included in the received network observation. In other embodiments, the conversion may be more involved. As an example of a more involved conversion, a malicious attack detection may be indicated where the received network observation is coupled with the occurrence of another type of network observation within a defined period. Based upon the disclosure provided herein, one of ordinary skill in the art will recognize a variety of approaches for converting network observations into indications of a malicious attack detection that may be used in relation to different embodiments.

Detection processing module 144 is configured to determine whether a malicious attack detection was indicated. Where a malicious attack detection was indicated, detection processing module 144 may operate to mitigate the detected malicious attack or may merely report the detected attack. Such mitigation may include any process known in the art for either eliminating or reducing the impact and future potential of the identified malicious attack.

Figure 1D:
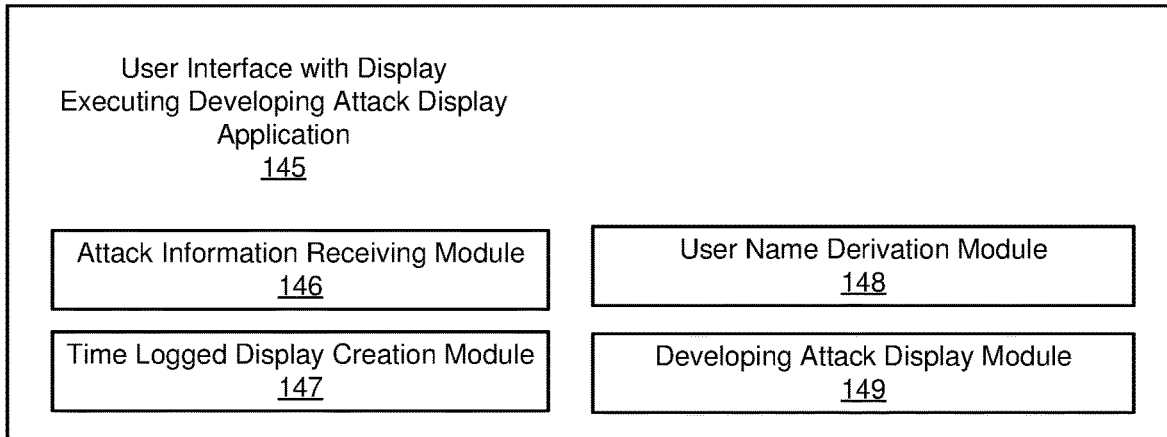

Turning to FIG. 1D, an example implementation of a user interface with display executing a developing attack display application 145 (e.g., user interface with display 195 executing developing attack display application 197) is shown in accordance with some embodiments. As shown in this example, user interface with display executing a developing attack display application 145 includes: an attack information receiving module 146, a time logged display creation module 147, a user name derivation module 148, and a developing attack display module 149.

Attack information receiving module 146 is configured to receive an indication of a detected attack. Time logged display creation module 147 is configured to generate one or more static displays each corresponding to a respective point in time similar to those discussed below in relation to FIGS. 6A-6F. User name derivation module 148 is configured to identify login and/or logout information including a user name, and to correlate the time of the respective login and logout times to when different nodes in a series of static displays become active, and based upon the correlation to deduce that the user name is associated with a given node. Developing attack display module 149 is configured to display the various static displays as a series of displays representing the evolution of a network attack.

Figure 1E:
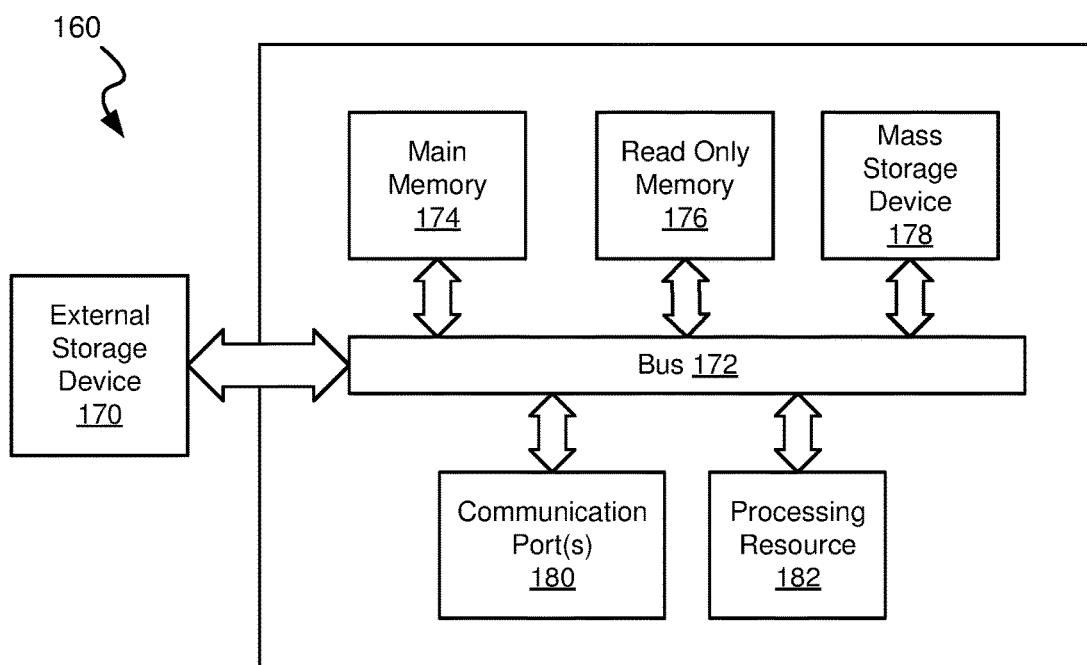

Turning to FIG. 1E, an example computer system 160 is shown in which or with which embodiments of the present disclosure may be utilized. As shown in FIG. 1E, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure. A computer system similar to that discussed in relation to FIG. 1D may be used to implement network security appliance 110 and/or network behavior observation appliance 120.

Figure 2A:
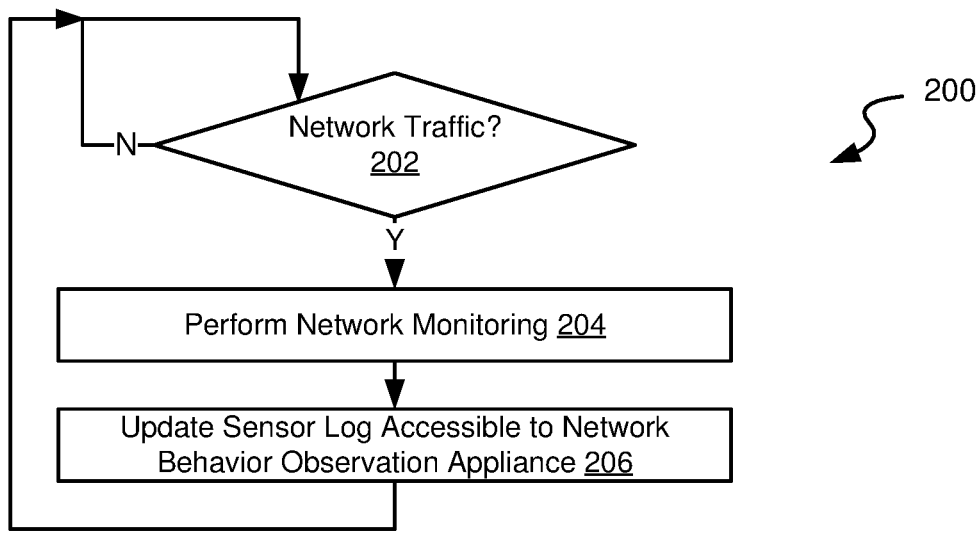
FIG. 2A is a flow diagram showing a method in accordance with some embodiments for gathering network information and incorporating in a sensor log by a network security appliance or a network sensor.

Turning to FIG. 2A, a flow diagram 200 shows a method in accordance with some embodiments for gathering network information and incorporating in a sensor log by a network security appliance governing access to a local network. Following flow diagram 200, as network traffic is received (block 202), network monitoring is applied to capture various attributes of the network traffic (block 204). The captured attributes are written to a sensor log that maintains all captured information for a limited period of time (block 206). In some embodiments, the sensor log is a first-in, first-out memory structure that maintains captured attributes corresponding to the most recently received network traffic. In various embodiments, the memory structure for the sensor log is sufficiently large to maintain captured attributes over a period that substantially exceeds a partition time. Such a partition time is a processing period over which logged sensor data is used to process logged sensor data into intermediates as more fully discussed below in relation to FIG. 3.

In some embodiments, the network traffic monitoring is performed using a commercially available Zeek™ network security monitor that allows for logging thousands of distinct network occurrences and formatting the data into user defined log files. Based upon the disclosure provided herein, one of ordinary skill in the art will recognize a large variety of network occurrences that may be incorporated into the aforementioned sensor log. One of ordinary skill in the art will also recognize that over a relatively short period of time the amount of logged network occurrences will exceed most practical storage implementations.

Figure 2B:
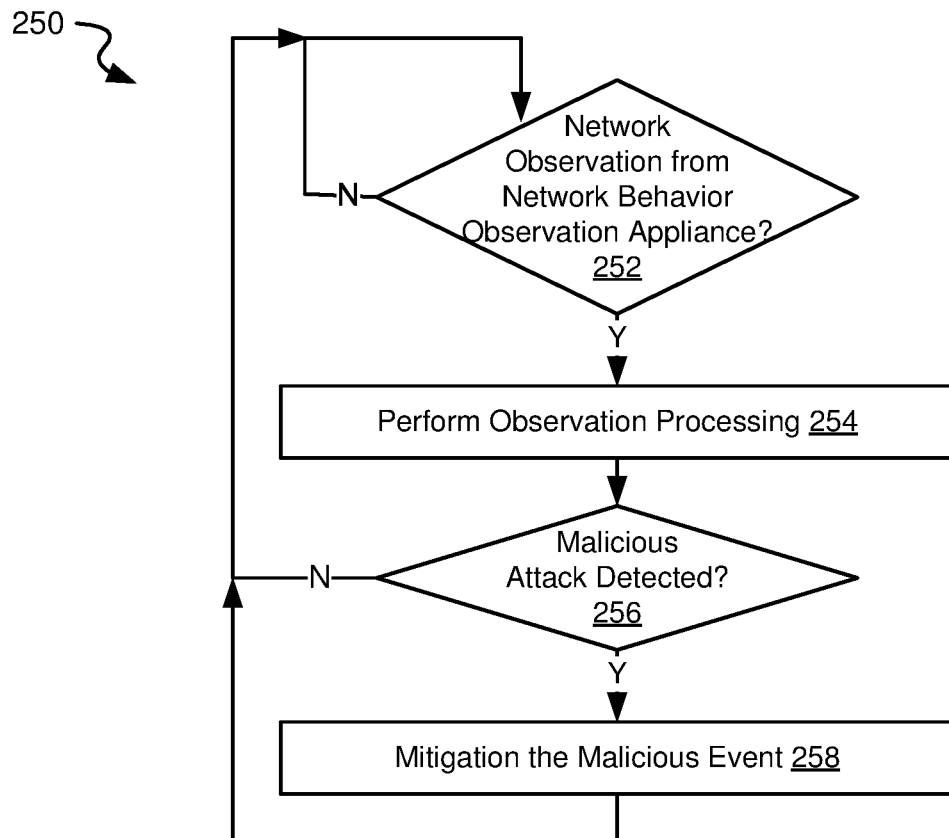
FIG. 2B is a flow diagram showing a method in accordance with various embodiments for processing, by a network appliance associated with a local network, network observations received from a network behavior observation appliance.

Turning to FIG. 2B is a flow diagram 250 shows a method in accordance with various embodiments for processing, by a network security appliance governing access to a local network, network observations received from a network behavior observation appliance. Following flow diagram 250, it is determined if a network observation has been provided from a network behavior observation appliance (block 252). Where a network observation has been received (block 252), observation processing is preformed (block 254).

Such observation processing is configured to, where appropriate, convert a received network observation into an actionable detection event (block 254). Such conversion may include any number of user-definable processes that use one or more network observations to, where appropriate, indicate a malicious attack was detected. In some embodiments, the conversion may be as simple as indicating a malicious attack was detected and including the information about the attack included in the received network observation. In other embodiments, the conversion may be more involved. As an example of a more involved conversion, a malicious attack detection may be indicated where the received network observation is coupled with the occurrence of another type of network observation within a defined period. Based upon the disclosure provided herein, one of ordinary skill in the art will recognize a variety of approaches for converting network observations into indications of a malicious attack detection that may be used in relation to different embodiments.

Based upon the conversion of the observation (block 254), it is determined whether a malicious attack detection was indicated (block 256). Where a malicious attack detection was indicated (block 256), mitigation of the detected malicious attack (block 258) is initiated. Such mitigation may include any process known in the art for either eliminating or reducing the impact and future potential of the identified malicious attack.

Figure 3:
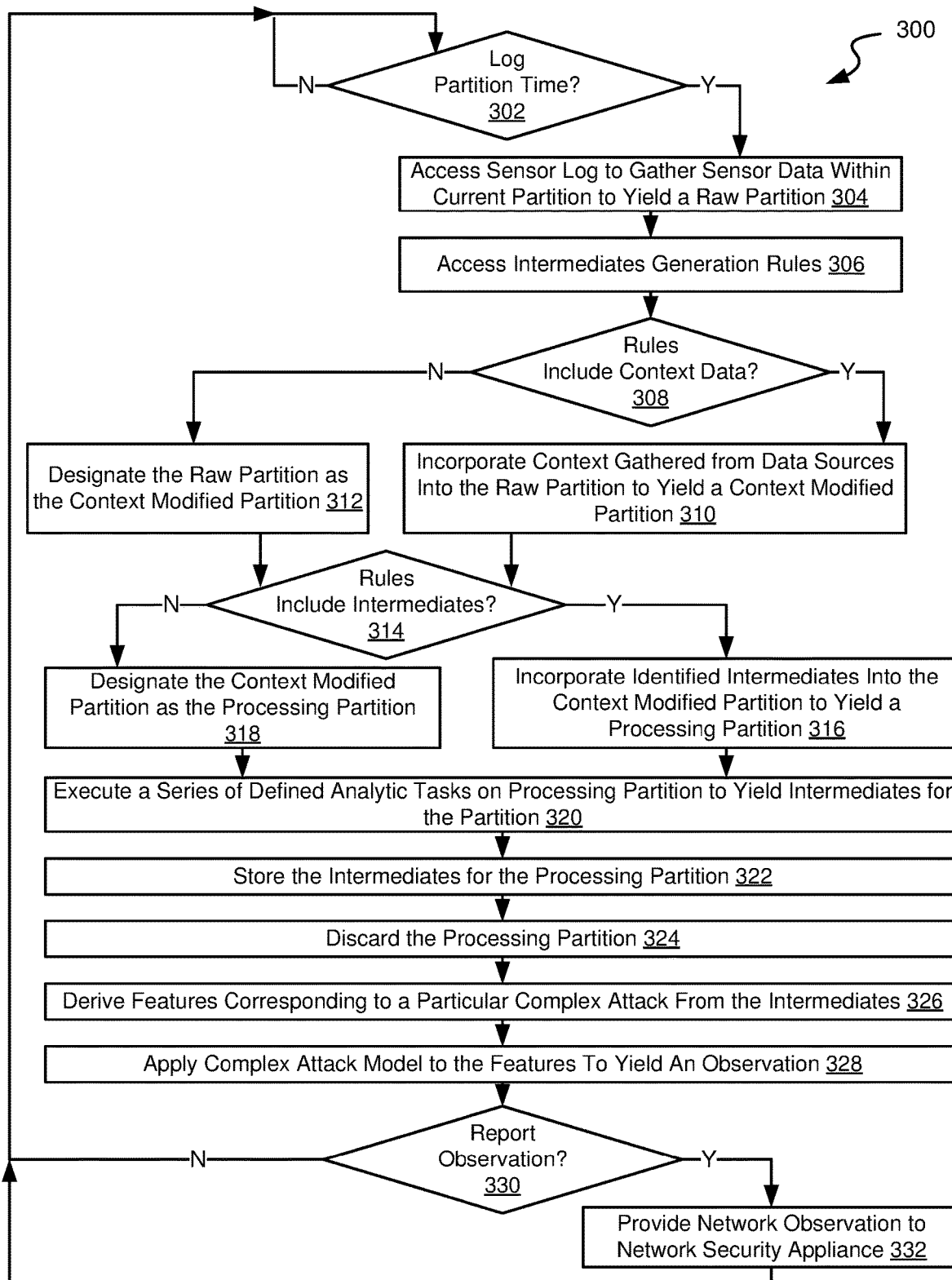
FIG. 3 shows a method in accordance with various embodiments for generating observations, by a network behavior observation appliance, where the observations are based at least in part on a sensor log provided from a network sensor deployed apart from the network behavior observation appliance in a local network.

Turning to FIG. 3, a flow diagram 300 shows a method in accordance with various embodiments for generating observations, by a network behavior observation appliance, where the observations are based at least in part on a sensor log provided from a network sensor deployed apart from the network behavior observation appliance in a local network. Following flow diagram 300, it is determined whether a partition time has passed and it is time to process the next partition (block 302). The partition time is a time period that defines the data from the sensor log that will be processed into intermediates. Thus, as an example, a partition time may be two (2) hours, and in such a case where the partition time began at noon on a particular data all data in the sensor log gathered between noon and two (2) pm on the particular data are processed together in the same partition. In other embodiments, a partition time is one (1) hour. The larger the partition time, the larger the amount of data from the sensor log that will be represented by the intermediates generated by processing the data in the sensor log and the greater the amount of processing bandwidth needed to generate the intermediates. Based upon the disclosure provided herein, one of ordinary skill in the art will appreciate different partition times that may be used in relation to different embodiments.

Once the partition time is passed (block 302), data from the sensor log generated by the network security appliance is accessed for the period corresponding to the partition to yield a raw partition (block 304). Intermediates generation rules are also accessed for storage local to the network behavior observation appliance (block 306). The intermediates generation rules include a recipe for generating the various intermediates that are desired including, inputs to be used in generating a particular intermediate, dependencies between different inputs to the given intermediate, and the series of processes to be done in order to generate the given analytic based upon the different inputs.

For each intermediate to be generated for the partition, a corresponding intermediates generation rule is accessed to determine whether any context data is to be used as an input to the respective intermediate (block 308). Such context data may be any information that adds to the data in the sensor log. Where context data is to be used (block 308), the identified context data is gathered from the sources of the various context data, and the gathered context data is incorporated into the raw partition to yield a context modified partition (block 310). Alternatively, where no context data is to be used (block 308), the raw partition is simply designated as the context modified partition (block 312).

Similarly, for each intermediate to be generated for the partition, the corresponding intermediates generation rule is accessed to determine whether any other intermediate(s) is/are to be used as input(s) to the respective intermediate (block 314). Where one or more intermediates are to be used (block 314), the identified intermediates are incorporated into the context modified partition to yield a processing partition (block 316). Alternatively, where no intermediates are to be used (block 314), the context modified partition is simply designated as the processing partition (block 318).

Once all of the inputs needed to process the particular intermediate is available (blocks 308-314), the dependencies for the inputs identified in the intermediates rule are used to orchestrate the series of processes or defined analytic tasks that are performed on the processing partition to generate the particular intermediate (block 320). The defined analytic tasks may be any analytic needed to generate the desired intermediate from the processing partition. Thus, as an example where the intermediate is the number of times the same request occurred in the partition time, the defined analytic may rely only on request and response sizes in the processing and count each of the identical size values to yield the particular intermediate. The generated intermediate is incorporated as a partition into an existing intermediate that has a number of other partitions each corresponding to a respective partition time (block 322). Accordingly, accessing an intermediate may be done by designating the desired intermediate and the particular partition (i.e., partition time) of interest. As intermediates include only a small amount of data compared with the inputs from which they were derived and are maintained over long periods of time, access to such intermediates by designating particular partitions allow for investigation of historical network activity that is not possible in other systems that process raw data. Further, the defined analytics used to generate the intermediates are only executed once on any given set of inputs, thus reducing the computational complexity that is performed at any given time.

Once an intermediate for a particular partition in time has been generated (block 320), the generated intermediate is incorporated as a partition of an existing intermediate of the same type as suggested above (block 322). At this juncture, the processing partition can be discarded (block 324) reducing the amount of data that is retained while still allowing using of historical data in detecting complex attacks. In some embodiments, the processing partition and/or one or more of the sensor data and/or the context is still available, but not used as use of a corresponding partition provides the information necessary making access to the original sensor data and/or context unnecessary.

Features corresponding to a particular type of complex attack are derived from the various intermediates (block 326). For example, where a machine learning model is trained to detect a particular type of complex attack, the features derived from the various intermediates are the inputs to the machine learning model. In some embodiments, the intermediates are designed to be inputs to the particular machine learning model. In other embodiments, the inputs for the particular machine learning model must be derived from one or more intermediates. It is noted that several machine learning models may use inputs derived from subsets of the available intermediates with each of the machine learning models configured for a respective objective.

Once the inputs for the machine learning model are available (block 326), each of the machine learning models are applied to their respective inputs derived from the available intermediates to yield their respective outputs in the form of observations (block 328). Such observations may include, but are not limited to, either an indication of a potential complex attack or an indication of no complex attack. Where an indication of a complex attack is included, the observation further includes a basis for why the indication of the complex attack was raised.

It is determined whether one or more of the observations is to be reported (block 330). In some embodiments only observations including an indication of a complex attack are reported. Based upon the disclosure provided herein, one of ordinary skill in the art will recognize a variety of rules that may be implemented that govern which and when an observation is reported that may be used in relation to different embodiments. Where a particular observation is to be reported (block 332), the observation is provided to, for example, the network security appliance that generated the sensor log (block 334).

In some embodiments tailored for identifying webshell attacks, data from sensor logs of a network security appliance are batch processed once per hour similar to that discussed above. In such an embodiment, modules of a network behavior observation appliance are triggered by a series of triggers that ultimately result in executing all analytics scheduled to run each partition period (e.g., one (1) hour). In some such embodiments, most analytics are executed every hour, while some only run once per day. The workflow begins by creating new partitions (tables) that will hold the data that will be generated in the next hour and recording the partitions in partitions table. Every new entry in the partitions table (i.e., a new partition of sensor intermediate data was created) causes an orchestrator to create a new dependency graph, which identifies—for each analytic—all dependency tables (e.g., context data, intermediates, and the like) that must exist before the analytic can execute. When a table is written without errors, this event is recorded in the partitions table, and this in turn triggers the orchestrator to determine if the newly written table fulfilled the dependency requirements for any analytic. If all dependencies for an analytic completed, the orchestrator sends a message to a task queue to execute the analytic.

A scheduler constantly reads from the task queue, and when the task queue contains a task to execute an analytic, the scheduler processes the task by executing the designated analytic function. The designated analytic function runs an SQL query (which gathers data from the analytic's dependencies and performs primary processing), performs additional higher-level processing of the data, and executes various APIs to write results to the corresponding table. In such an embodiment, the entire workflow may execute hundreds of analytics each hour—in the correct order—on current and historical data to determine if malicious activity occurred during the one specific hour being analyzed.

Unless an error occurs, each hour is analyzed only once. Because delays can exist between an event occurring and the sensor transmitting the metadata about the corresponding network connection to the network behavior observation appliance, the network behavior observation appliance adds an additional delay to allow as many sensor logs as possible to be written before analyzing the sensor logs. This additional delay is reevaluated periodically to balance maximization of sensor logs written verses minimizing delay.

Each pipeline is a series of analytics that ultimately creates the features used by a machine learning model to meet an objective. A feature is a characteristic of the underlying sensor data that was processed in a specific way. The webshell pipeline was designed to gather, process, and record the data required to build the historical features needed by a webshell machine learning model to determine if an attacker installed a new webshell on a webserver.

The webshell pipeline consists of the HTTP log data, a common intermediate table that records external IP addresses that should be treated as internal devices for the purposes of analysis, a common intermediate table that identifies distinct second-level domains, a webshell-specific intermediate that creates features for the machine learning model, and the observation analytic that executes a trained machine learning model that accurately identifies if webshell activity was observed.

The webshell machine learning model makes its decisions based on features collected from raw data and intermediates that provides an aggregated view of the raw data. The primary type of data for this model is HTTP records. HTTP records are collected over a window of time up to present. An initial cut (filtering) of these records is performed to reduce the dataset under consideration within recognized safe limits. The decision process used for this cut is: first, for a particular destination IP, host, and URI, whether the number of distinct source IPs that contacted the URI exceeds a threshold; second, for a particular destination IP, whether there are any connections where the source IP is considered to be external to the protected network; third, for a particular host, whether there are any connections where the source IP is considered to be external; and fourth, for the domain of the host (i.e., webserver), whether the number of distinct source networks seen with externally directed HTTP requests to that domain exceeds a threshold.

The aforementioned first cut eliminates from consideration web traffic from internal networks to external destinations as well as heavily visited hosted URIs. The aforementioned second cut is performed that focuses on other extraneous activity. Examples of this extraneous activity include inbound scanning activity and the use of external proxy sites. A variety of tests are performed to identify this activity.

Some analysis must be done before applying the third cut. In order to make a judgement about activity, we must define the object under consideration. In some cases this object can be something simple like IP address. In other cases the object can be a collection of features, such as source IP address combined with User Agent string. In the case of identifying potential webshell activity, the object is more complex and requires a sequence of steps that combines the following fields: source IP address, destination IP address, host, URI, and User Agent. In some circumstances, this object could also be referred to as a pivot, pivot point, or aggregation subject since it reflects a combination of features. The selection of the object is critical to ensuring that the resulting information is accurate, meaningful, and actionable; the choice of object can have a significant impact on the accuracy and effectiveness of the resulting model results. For the webshell machine learning model, two adjustments are made that incorporate the source IP address, destination IP address, host, URI, and User Agent. For the initial adjustment, selecting an object based on only the IP address or only the hostname may result in incomplete or inaccurate information. Some webshells can continue to operate correctly when the request host field is null. In addition, there are cases where a host might be load balanced across multiple IP addresses, or where a single server is serving multiple host names. For that reason, the system will merge the host values and destination IP address values using connected components and represent the combined host/destination IP address field with a new unique identifier (ID). For the remaining fields (source IP address, User Agent, and URI), it is important to account for cases where a webshell might have multiple source IP addresses (though this is considered to be rare) or where a webshell purposely uses multiple User Agent strings in order to avoid detection. After grouping records based off of the first ID (host/destination IP), the network behavior observation appliance makes a second adjustment to the object by merging the URI with the concatenation of source IP address and user agent also using connected components. A side benefit of this method of object construction is that the number of objects under consideration is reduced by one order of magnitude.

Once the object has been isolated, a variety of additional features specific to each object are calculated. At this point an additional cut is made. This cut relies on specific heuristics that are generally associated with normal web traffic and have never been seen in the sample traffic that has been generated by any of the webshells tested as a part of the research for developing this model. An example of one of the heuristic tests is the number of web requests associated with the pivot object where the response to the web request has delivered a binary object such as an 'mp4' file or a 'debian.binary-package'. These types of files are seen in normal traffic but have not been seen in the testing of any known webshell. This cut does lower the potential generalization ability of the model, but it also reduces the number of potential objects to consider and makes false positives less likely.

In one embodiment, the webshell machine learning model uses thirty-four (34) features in order to identify whether the object is likely benign or malicious. Utility of such a webshell machine learning model relied upon training the model against a large set of benign activity and eighteen (18) samples of webshell activity across eight (8) types of distinct webshells. Two types of the webshells were not a part of the training but were successfully identified by the trained model.

The following table provides a description of some of the features or groups of features used by the aforementioned embodiment of the webshell machine learning model with the reason they offer effectiveness:

detected attack 410) in accordance with some embodiments. As shown, when an attack is initially identified there may be little information about the attack beyond what type of attack it is as indicated by detected attack 410 and the known impacted network element 415a. Display of such information out of context is of little value to a user attempting to mitigate or even understand the attack. This is particularly true if the attack is a complex attack involving two or more stages such as, for example, a webshell attack. In such a webshell attack the initial information may not be sufficient to identify the launch point from within the network and/or a user originating the attack. Some embodiments provided herein provide an enhanced attack display system and/or method that allows for providing a user with a visual display configured to reveal the evolution and extent of an attack.

Figure 5:
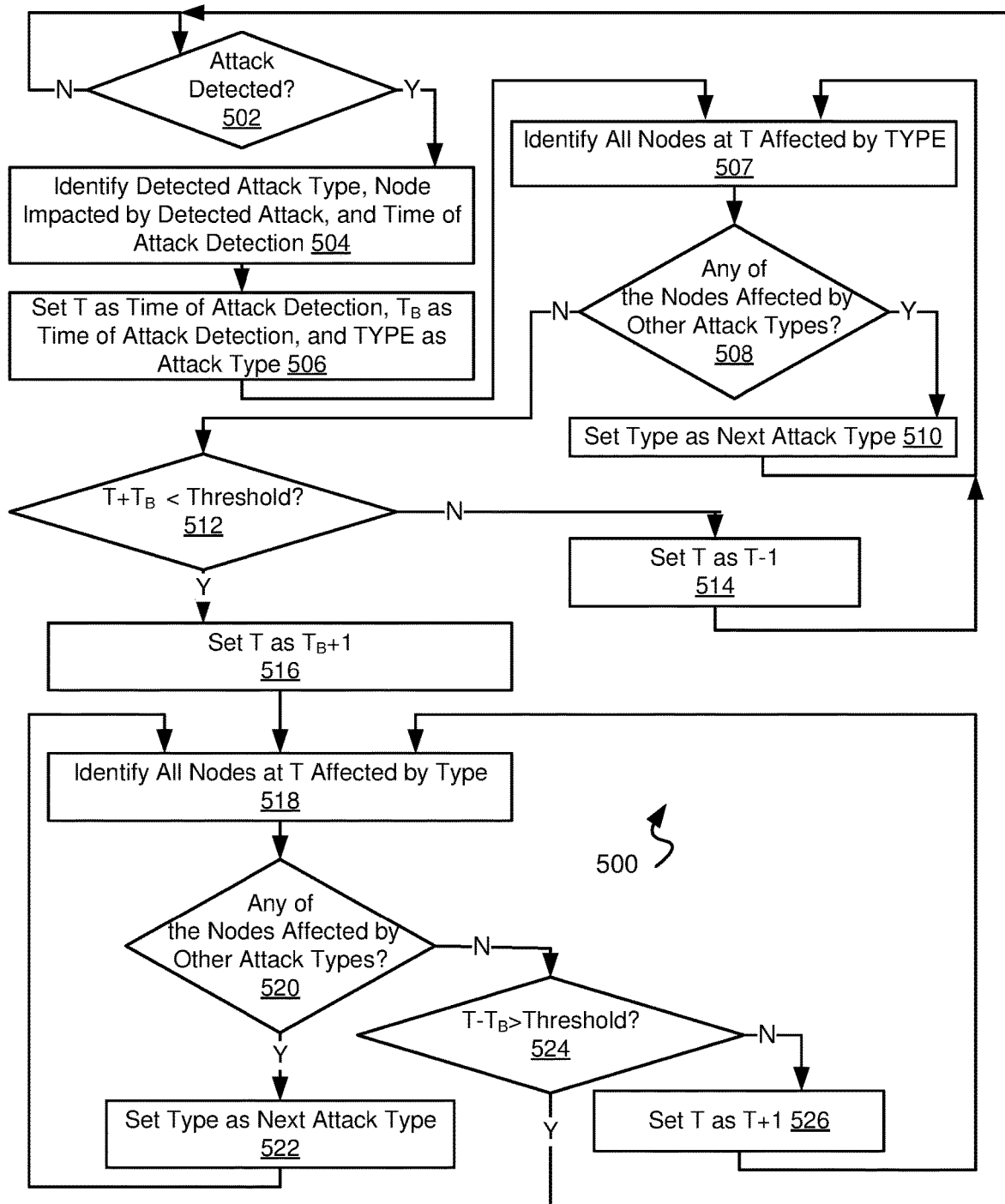
FIG. 5 is a flow diagram showing a method in accordance with some embodiments for displaying a computer network attack over time.

Turning to FIG. 5, a flow diagram 500 shows a method in accordance with some embodiments for displaying a computer network attack over time. Such a display of an attack over time provides a user with a visual display configured to reveal the evolution and extent of an attack. Following flow diagram 500, it is determined whether an attack has been detected (block 502). Such a determination of an attack detection may be done using any process known in the art for indicating the occurrence of an attack detection. In some embodiments, the determination of a detected attack corresponds to a message generated with a malicious attack is detected in block 256 of FIG. 2B. Based upon the disclosure provided herein, one of ordinary skill in the art will recognize a variety of mechanisms that may be used to make a determination of a detected attack in accordance with different embodiments.

Where an attack is detected (block 502), the type of the attack is identified, the node (i.e., network element) impacted by the attack is identified, and the time of the

| | |
|---|---|
| Request or response variability | Many of the examples of benign requests have a form where the same request would be repeated multiple times and/or the response they received would be the same. An attacker interacting with a webshell naturally will make different requests and seeking different types of information with each request: perhaps the first request is to get some information about the system environment, and the second request is to perform an action. Knowing that identical requests (or responses) always are exactly the same size, request and response sizes were used as a proxy for the actual requests and responses. When webshell activity occurs, the request and response sizes vary, which are captured by a couple of features. |
| Server and URI path not visited recently from source | Most compromised devices are behind security devices that prevent an attacker from directly reaching them at an arbitrary time, so these compromised devices typically make polling requests to external environments that can be detected and caught. Web servers, on the other hand, allow an attacker to directly connect to the webshell from an external source. Because of this, an attacker is likely to initiate communication with the webshell only when necessary. The effect of this is that the activity (a specific external source IP contacting a server on the webshell's URI) will appear new. |
| Responses not of excessive length | Some benign traffic has very long responses. An attacker designing a system will tend to not generate more traffic than necessary in an attempt to avoid looking anomalous. All of the tested webshells tended to have fairly moderate sized responses. |
| User agent not an obvious bot | When communicating with webshells, attackers tend to use either a regular browser (provided that the server component of the webshell is rich) or a custom client. One webshell example tested did use a User Agent string that looked like a known web crawling bot in order to evade detection, but the other examples did not. The model takes into account that this characteristic is possible but unusual. |

Figure 4A:
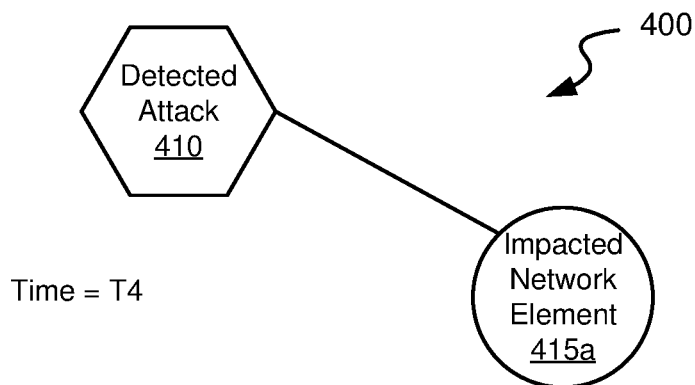
FIGS. 4A-4C show example static displays of a recorded detected malicious behavior indicating the malicious behavior detected at a time T4 and showing network elements impacted by the malicious behavior in accordance with some embodiments.

Turning to FIG. 4A, an example static display 400 of a detected malicious behavior (e.g., detected attack 410) indicating the malicious behavior detected at a time T4 and showing network elements (e.g., impacted network element 415a) impacted by the detected malicious behavior (e.g., attack detection is identified (block 504). The time of attack detection is a point in time where sufficient information existed to discern the attack. As discussed above in relation to FIG. 3, an attack detection may be generated based upon historical information, and as such the time of the attack detection may be either a current time or a time in the past. In other embodiments, attack detection is done without historical information and as such a time of an attack detection will be current time. Using example static display 400 of FIG. 4 as an example of a detected attack, the type of attack is detected attack 410, the impacted node is impacted network element 415a, and time of the attack detection is T4. Of note, a number of other activities may be detected at the same time as the time of the attack detection, but their interrelationship with the detected attack may not be clear. A variable T and a variable $T_B$ are both set equal to the time of the attack detection, and a variable TYPE is set equal to the detected attack type (block 506).

Figure 4B:
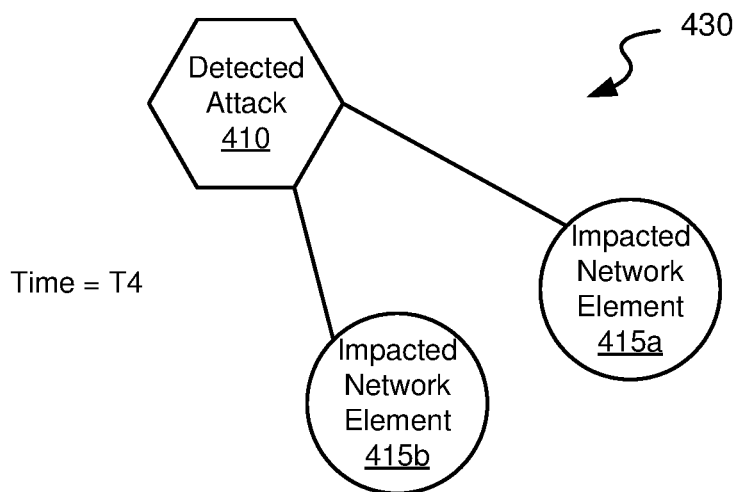

All nodes are identified that are impacted by the same TYPE at time T (block 507). An example of this is shown in FIG. 4B as an example static display 430 that corresponds to the same time (T4) as example static display 400 of FIG. 4A. As shown, network element 415b is also being impacted by the same detected attack 410, and as such network element 415b would be a node identified as impacted by the same TYPE at time T in block 507. In some embodiments, the hexagon shapes corresponding to a given detected attack (e.g., detected attack 410) may be colored to suggest the severity of the indicated attack. For example, a yellow color may indicate an attack of low severity, an orange hexagon may indicate an attack of mid-level severity, and a red hexagon may indicate an attack of high severity.

In some embodiments a user can be given access to filters that select what information is allowed to be included on example static displays as they are generated. For example, a user may be allowed to indicate which nodes (e.g., only nodes within a particular region of the network and/or performing certain functions are to be included, and/or which threats are to be included). In some embodiments a hexagon indicating a threat includes language identifying the threat (e.g., which rule was violated), and circles indicating nodes may include language identifying an IP address of the node, the device type of the node, a username associated with the node, or the like. Based upon the disclosure provided herein, one of ordinary skill in the art will understand a variety textual information that may be included with different elements on a generated static display.

Figure 4C:
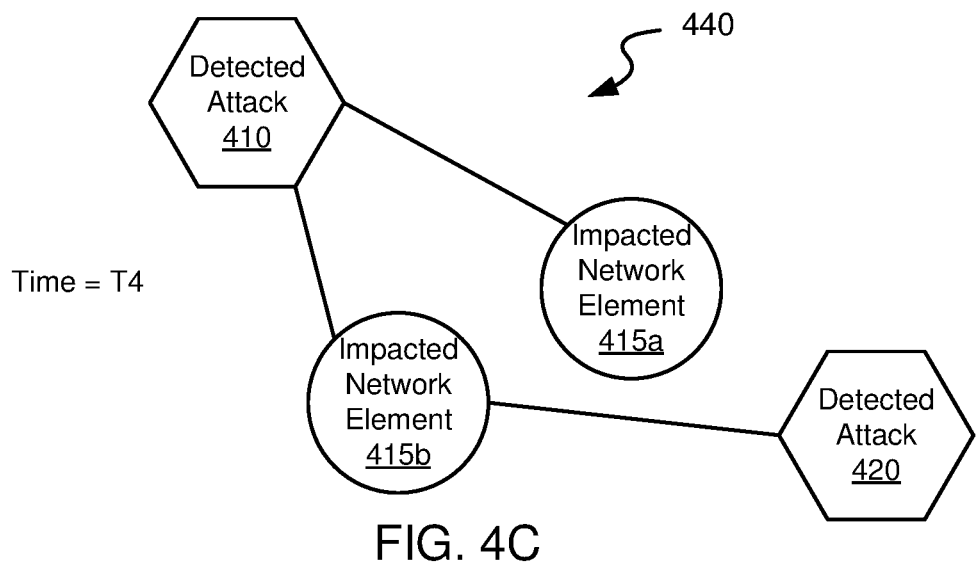
Figure 6A:
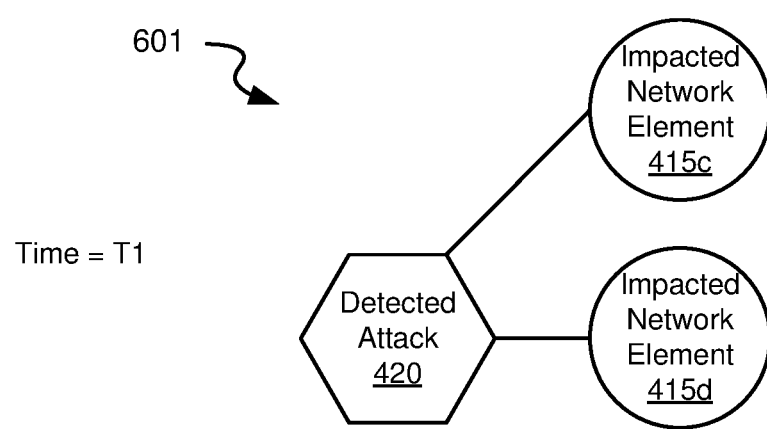
FIGS. 6A-6F show a series of static displays from times T1 through T6 representing times both preceding and succeeding the time T4 of FIG. 4 showing the detected malicious behavior of the static display of FIG. 4 developed with both future and historical information to show the interconnected nature of the attack detected at time T4 in accordance with various embodiments.
Figure 6B:
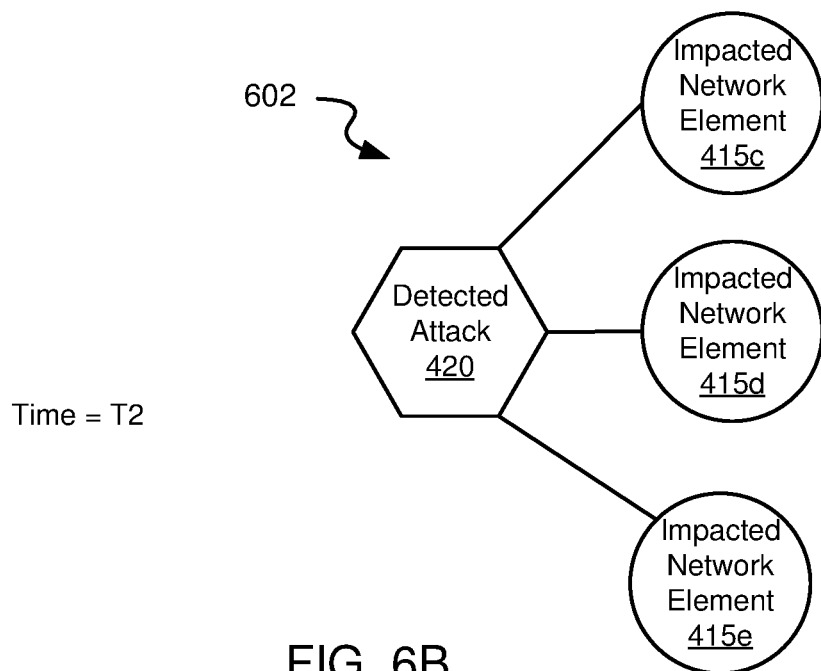
Figure 6C:
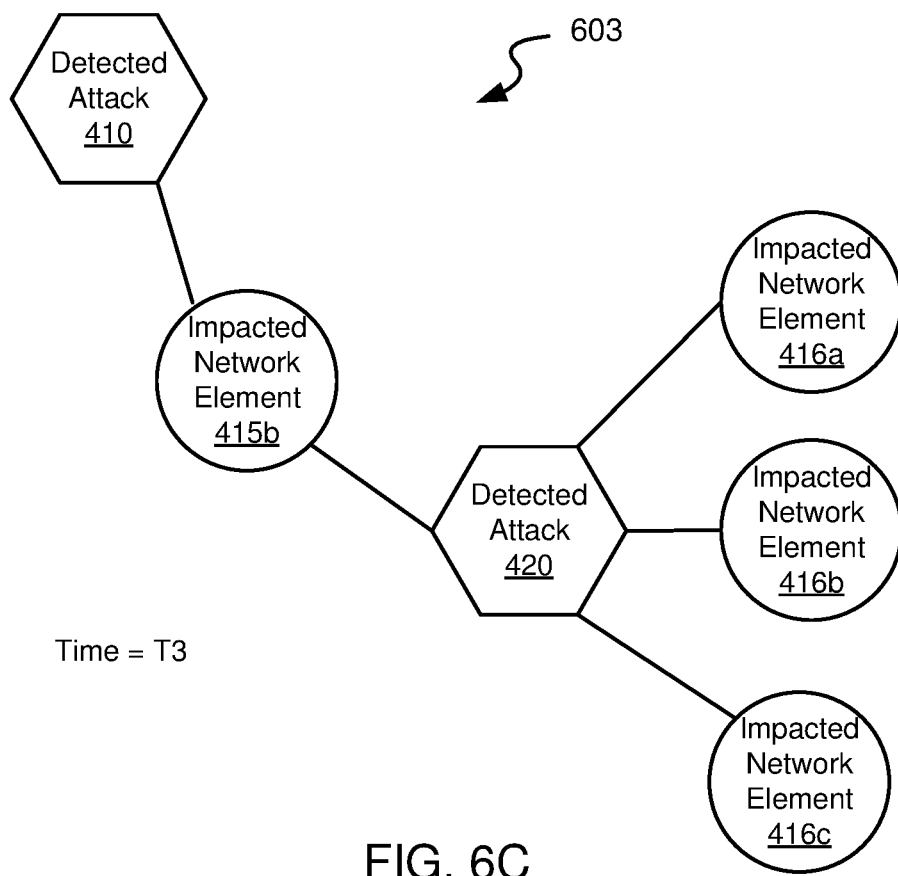
Figure 6D:
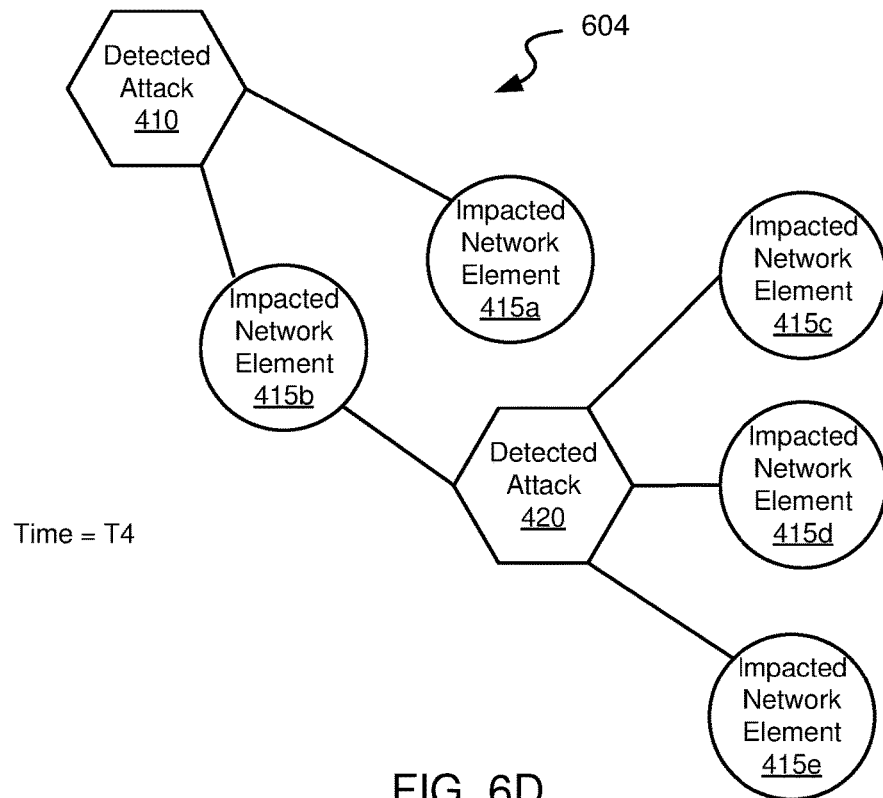

Once all of the nodes affected by the same TYPE at time T have been identified (block 507), it is determined whether any of the identified nodes have been affected by any other attack type (block 508). Using the example of FIG. 4B, it would be determined whether either or both of network element 415a and/or network element 415b are impacted at time T4 by any type of attack other than detected attack 410. Turning to FIG. 4C, an example static display 440 that corresponds to the same time (T4) as example static display 400 of FIG. 4A is shown. In this example, network element 415a is also impacted by a detected attack 420, and as such detected attack 420 and its interrelationship with network element 415b would be found in block 508.

Where another type of detected attack is identified as impacting at least one of the previously identified nodes (block 508), TYPE is set equal to one of the other types of network attacks (block 510) and the processes of blocks 507, 508 are repeated for this different type of network attack. Using FIG. 4C as the example, only one other type of detected attack (detected attack 420) is identified, and as such TYPE would be set equal to the type of detected attack 420. With this done, all nodes impacted by TYPE at time T are identified (block 507). Turning to FIG. 6D, an example static display 604 that corresponds to the same time (T4) as example static display 400 of FIG. 4A is shown. In this example, a network element 415c, network element 415d, and a network element 415e are also impacted by a detected attack 420, and as such are shown. For this example, example static display 604 includes all impacted network elements 415 and interrelated detected attacks 410, 420 that are at issue at time T4.

Where, in the alternative, another type of detected attack is not identified as impacting at least one of the previously identified nodes (block 508), it is determined whether $T+T_B$ is less than a defined threshold value (block 512). The threshold value is a user programmable value that allows a user to define how many time periods before and after an attack is detected that are to be displayed as part of an interactive video display showing the evolution and extent of an attack.

Where $T+T_B$ is not less than a defined threshold value (block 512), then graphics for additional periods preceding time $T_B$ (i.e., the time of attack detection) are to be created. In such cases, T is set equal to T−1 to go to the next preceding period (block 514) and the processes of blocks 507-512 are repeated for this preceding time. Thus, using example static display 604 of FIG. 6D that corresponds to the same time (T4) as example static display 400 of FIG. 4A, the next time would be T4−1 or T3. Turning to FIG. 6C, an example static display 603 of FIG. 6C that corresponds to time T3 developed using the processes of blocks 507-512 for time T3 is shown. As shown, all of the elements of example static display 604 existed at time T3 except the detected attack 410 of network element 415a. The processes of blocks 507-514 are repeated for a number of time periods (i.e., T1-T3) until $T+T_B$ becomes less than the defined threshold value (block 512). This results in a number of static displays (e.g., an example static display 602 corresponding to time T2 shown in FIG. 6B, and an example static display 601 corresponding to time T1 shown in FIG. 6A).

Figure 6E:
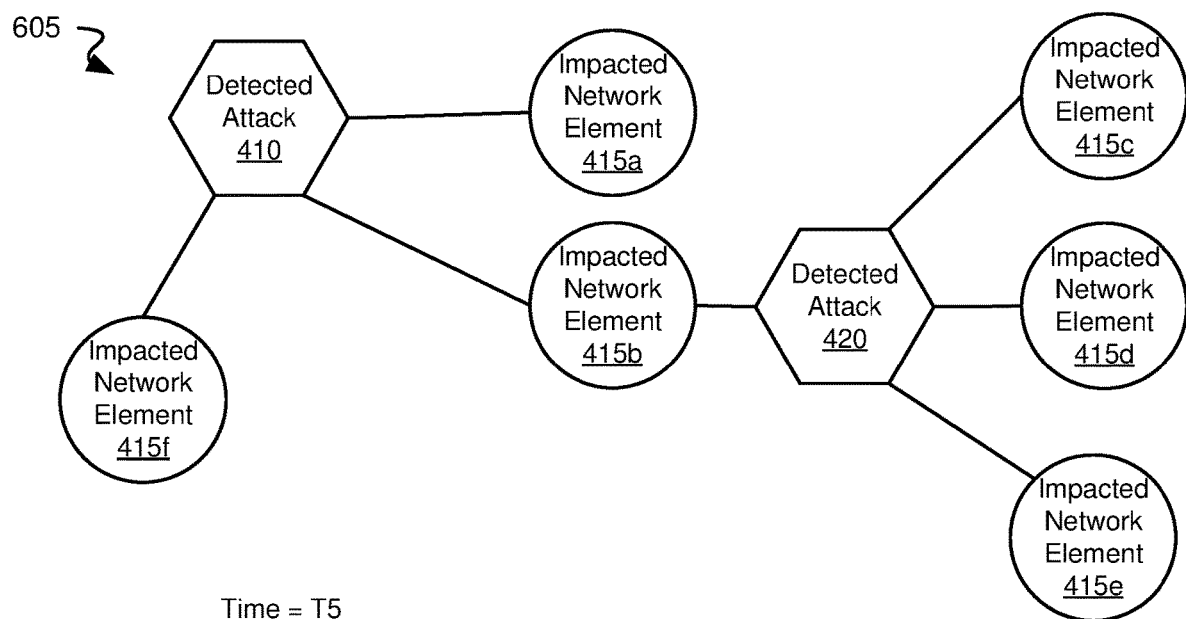

Alternatively, where $T+T_B$ is less than a defined threshold value (block 512), then all of the desired graphics for the additional periods preceding time $T_B$ (i.e., the time of attack detection) have been created. At this juncture, graphics for all interrelationships of a detected attack have been developed up to the detection. The aforementioned graphics represent the user's first view of an evolving threat landscape.

Where $T+T_B$ is less than a defined threshold value (block 512), T is set equal to $T_B+1$ (i.e., the time period following the time of attack detection) (block 516) as graphics showing the developing threat after detection of the threat are generated. To this end, all nodes are identified that are impacted by the same TYPE at time T (block 518). An example of this is shown in FIG. 6E as an example static display 605 that corresponds to time (T5). As shown, network element 415f is also being impacted by detected attack 410, and as such network element 415f would be a node identified as impacted by the TYPE at time T in block 518.

Of note, the information being displayed for periods beyond $T_B$ can be current information that is dynamically updated as it becomes available based on internal logic combined with the user's ability to interact with the information displayed. Once all of the nodes affected by the same TYPE at time T have been identified (block 518), it is determined whether any of the identified nodes have been affected by any other attack type (block 520). Where another type of attack is identified as impacting any of the identified nodes (block 520), TYPE is set to one of the other types of detected attack (block 522) and the processes of blocks 518-520 are repeated for the next TYPE at time T.

Figure 6F:
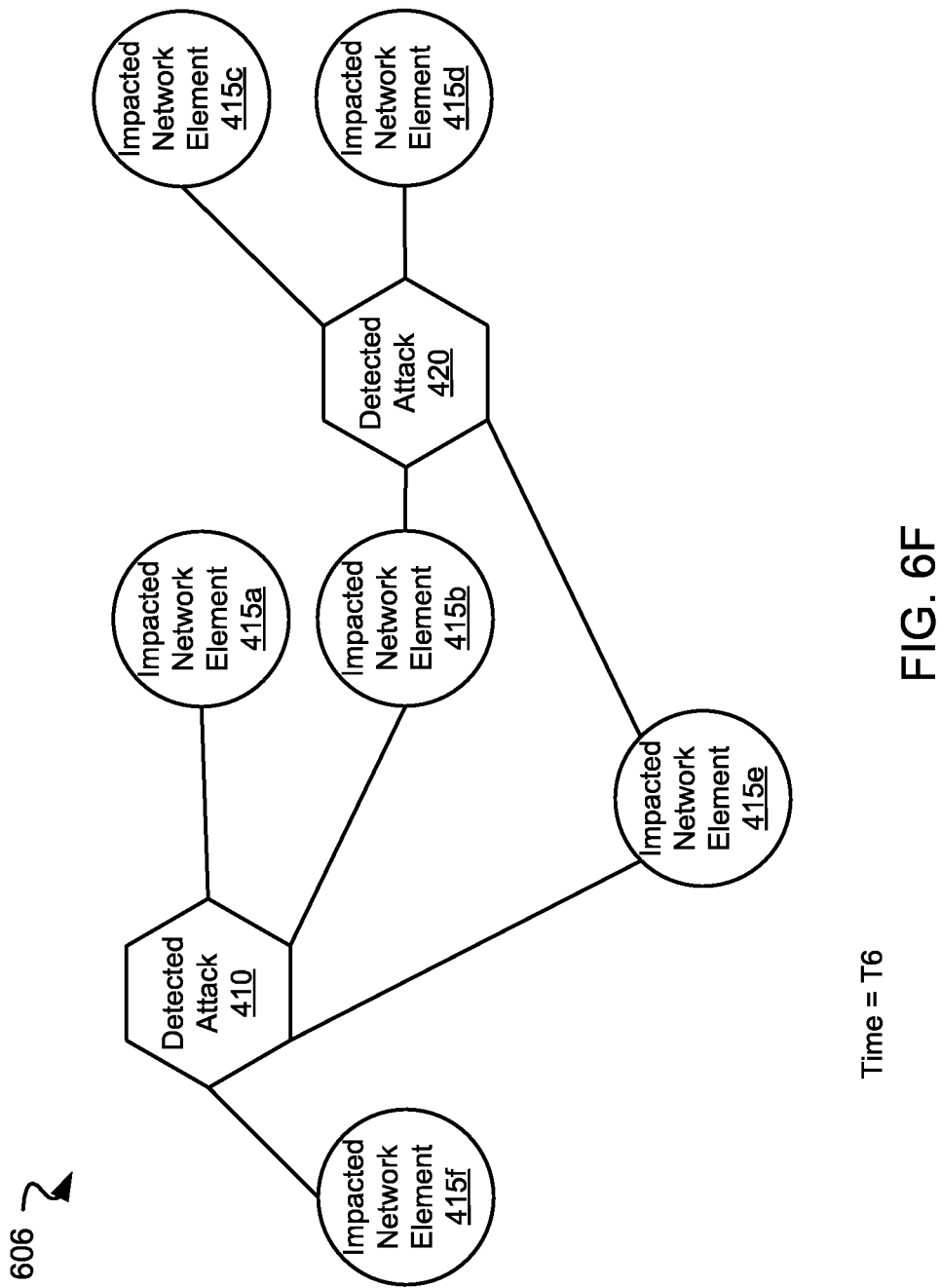

Alternatively, where no other type of attack is identified as impacting any of the identified nodes (block 520), it is determined whether $T-T_B$ is greater than the defined threshold value (block 524). Again, the threshold value is a user programmable value that allows a user to define how many time periods before and after an attack is detected that are to be displayed as part of an interactive video display showing the evolution and extent of an attack. In some cases, there is no limit on the number of periods after an attack is detected that are to be displayed as part of an interactive video display showing the evolution and extent of an attack. Rather, in such a system, the data is dynamically displayed as it comes available and continues until the user stops the display update.

Where $T-T_B$ is not greater than the defined threshold value (block 524), then graphics for additional periods succeeding time $T_B$ (i.e., the time of attack detection) are to be created. Again, it is noted that this limit of $T-T_B$ being greater than the defined threshold value may be removed where the system is to continue updating until a user indicates a stop. In such cases, T is set equal to T+1 to go to the next succeeding period (block 526) and the processes of blocks 518-526 are repeated for this succeeding time. Thus, using example static display 605 of FIG. 6E that corresponds to time T5, the next time would be T5+1 or T6. Turning to FIG. 6F, an example static display 606 of FIG. 6F that corresponds to time T6 developed using the processes of blocks 518-524 for time T6 is shown. As shown, all of the elements of example static display 605 existed at time T5 except that network element 415*e* is now also impacted by detected attack 410. The processes of blocks 518-526 are repeated for a number of time periods until $T-T_B$ becomes greater than the defined threshold value (block 524). This results in a number of static displays (e.g., an example static display 606 corresponding to time T6 shown in FIG. 6F).

In some embodiments, heuristics and machine learning determine how much information to include in each static display to ensure that a user is not overwhelmed with too many details. This includes an algorithm to collapse nodes to summarize multiple items that share a common trait (i.e., 25 computers that all triggered the same detection). Thus, for example, network elements 415*c*, 415*d* can be collapsed with language or color indicating the number of nodes represented. This algorithm considers factors such as the number of nodes present, the severity of the detection, and the age of the event (relative to the time that is currently being viewed in the Visualizer). In various embodiments, reinforcement learning is used to make the decisions as to what information to display. In such a system, volunteers are presented with a number of different static displays that each represent the same time, and the volunteer clicks a LIKE or DISLIKE button for each static display based on if it is easy to understand, then is presented with a different variation. The reinforcement learning model trains on all the data [the variations' parameters+users' likes/dislikes] to determine how much detail to display for all possible scenarios.

In such embodiments, a desired view is developed by applying certain filters and collapsing nodes into a summary view. In a simple example, only the computer and detection icons related to high-profile, high-severity detections are presented; the display can be understood by an analyst because the system filters out (removes from the current view) a large number of network elements related to only low and medium-severity detections.

Whenever the user adjusts a filter, the internal logic uses the same heuristics and machine learning described above to adjust how best to display the information to the user. When the logic decides to collapse multiple icons into a single icon, the system displays a summary icon with a number inside it that reflects how many items the single icon now represents. A user who wants to see more information about a node with a summary icon can use the UI and/or trackpad to zoom in on the node. When this occurs, the static displays are dynamically updated to reflect the number of nodes s as well as any accompanying details to ensure all displayed information is readable.

Figure 7:
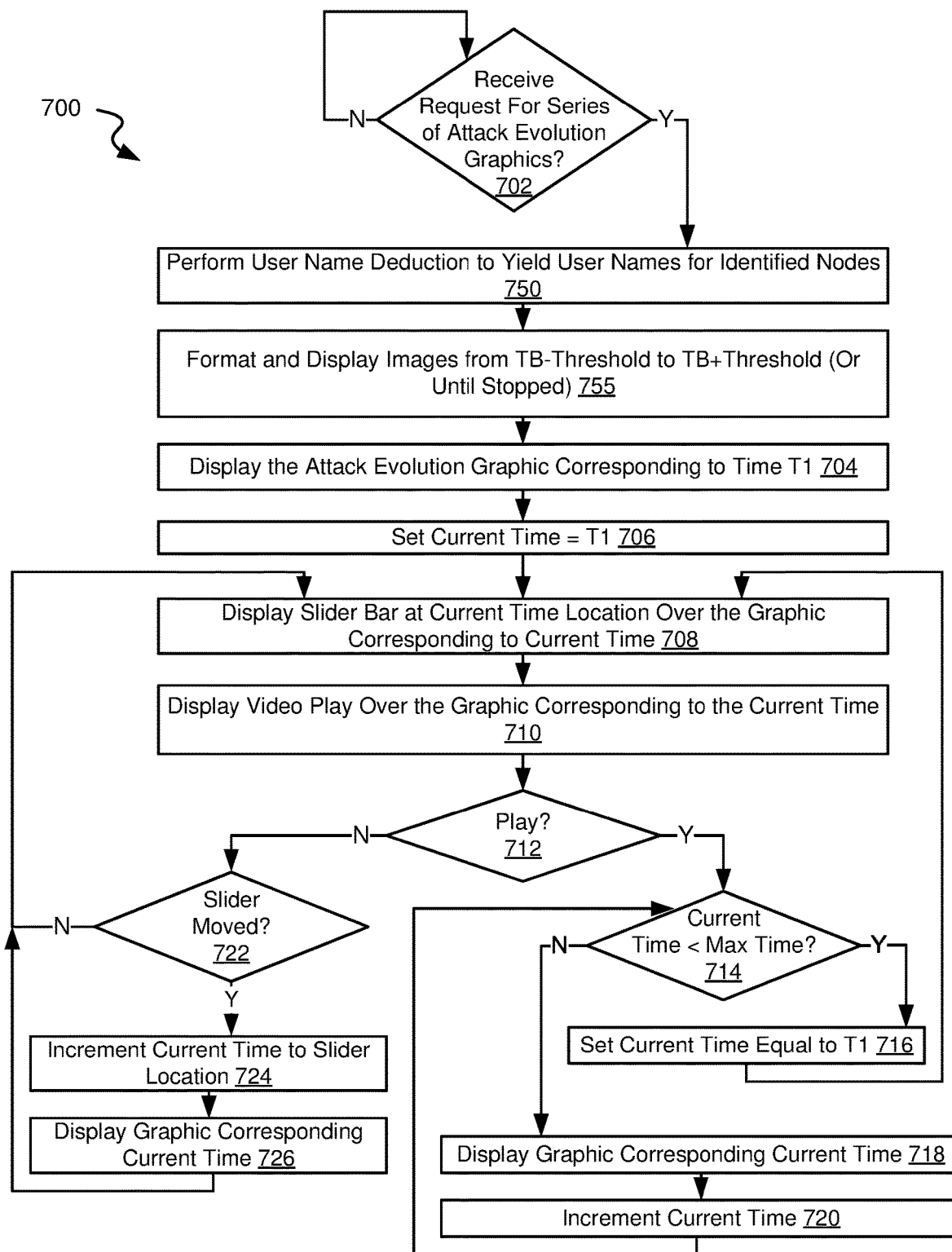
FIG. 7 is a flow diagram showing a method in accordance with some embodiments for playback of a series of attack evolution graphics.

Turning to FIG. 7, a flow diagram 700 shows a method in accordance with some embodiments for playback of a series of attack evolution graphics. Following flow diagram 700, it is determined whether a request from a user to view a certain series of static displays that together represent an evolving threat landscape (e.g., the series of example static displays 601-606 representing an evolving threat landscape from T1-T6).

Where a request is received (block 702), a user name deduction process is applied to each node within the series of static displays to yield user names for each of the nodes (block 750). In many cases the user name is not advertised. In such cases, historical data is used to deduce the likely username associated with each of the nodes. In particular, when a node becomes active in one or more of the static graphs, the network is queried to identify any user logins that occurred around the same time, and this is deduced to be the user name associated with the particular node, and this information may be added to the node in the individual static displays where the node appears where there is sufficient room and/or the user desires the information.

The requested static displays are formatted into images representing the respective time periods from $T_B$−Threshold until $T_B$+Threshold where the entire evolution landscape is complete or until the current time where the attack is ongoing (block 755). An initial attack evolution graphic is shown that is the first static graphic in the selected series (e.g., static display 601 corresponding to time T1) (block 704) and a Current Time variable is set to T1 (block 706).

A slider is displayed at the current time location (e.g., to the far left where Current Time is T1) (block 708), and a video play button is displayed over the static display corresponding to the Current Time (block 710). These can be a traditional slider bar that causes the display to change in time (i.e., select a different static display corresponding to the time represented by the location of the slider bar), and to start a video playback of the series of static images.

It is determined whether the user has selected the video play button (block 712). Where the user selected the video play button (block 712), it is determined if the Current Time is less than a maximum time (i.e., the end of the available static displays)(block 714). Where the Current Time is less than a maximum time (block 714) there remain one or more static displays to be shown as part of the selected video. In such a case, the static display corresponding to the Current Time is displayed (block 718) while the Current Time is incremented (block 720). The processes of blocks 714, and 718-720 are repeated until all of the static displays have been shown in sequence. In this way the user is presented with a video of the threat landscape. Once the last available static display has been displayed (block 714), the Current Time is set equal to T1 (block 716), and the process begins again at block 708.

Alternatively, where the user has not selected the video play button (block 712), it is determined whether the user has moved the slider bar (block 722). Where the slider bar has been moved (block 722), the Current Time is changed to match the location of the slider bar (block 724) and the static display corresponding to the current time is displayed (block 726).

In some embodiments, the evolving threat landscape is updated in real time as additional time periods become available. As it is updated, a time on the display updates to reflect the time of the currently displayed static display. When the slider bar is moved, the time is updated to match the movement of the slider bar. In some embodiments a user is also enabled to bookmark certain pieces of information in the display that are of interest. Examples of data that can be bookmarked are indicators (IP addresses, usernames, filenames, etc.) and detection rules (i.e., detected attacks). Because the representation of the evolving threat landscape can change often, it is important to direct the system to focus on key aspects of an intrusion.

Bookmarking an item causes the system to annotate it as important. Later, if a user selects a bookmark, this action will override any currently selected filters and update the evolving threat landscape to display only the nodes associated with the bookmark(s). These bookmarks can be shared with other users. A bookmark may be created by interacting with a node in the graph or by manually entering a value (e.g., an IP address or user name).

Bookmarks may also refer to either a point in time or a time range on the timeline. These bookmarks are available for a user to return to periods that they found interesting. These time-based bookmarks can also be shared with others. The user will also have the option to see bookmarks that the system has identified. These are specific time periods that have interesting behavior. This will be determined by a mixture of heuristics and machine learning, with specific techniques to be determined.

User names (i.e., accounts) may be bookmarked like other events. The system will identify devices that are associated with an account based on network traffic. Some events will have associated accounts, while others will be deduced using the aforementioned approach to yield an implied user name based upon login and/or logout events. The system will show devices that are associated with the accounts at a given time.

In some embodiments, all potential detected attacks are selectable-even those that have not been received before the current time. In such a situation the display will focus on new threats that occur. All new detections will appear with individual nodes for all data points, where the nodes are algorithmically collapsed as previously discussed. In various embodiments, when one or more bookmarks are selected to be displayed, this will override the filter settings. The selected bookmark(s) becomes the focus for the replay; only nodes associated with the selected bookmark(s) will be displayed during the replay. The bookmark may be an IP address, username, process_id, another indicator, or a detection rule. The bookmark may be selected by interacting with the graph before (or while) playing the graph through time, or the bookmark may also be entered directly. When a bookmark is selected to be displayed, the corresponding focus icon will always be displayed. If the bookmarked event has not occurred yet, the icon will be gray. (For example, if I select to display "guest" username as a bookmark and the login event for that username has not occurred, then the username and the affected computer(s) will start as gray; once the event occurs, the icon will return to its normal color.) As time progresses, other nodes that are connected to the focus node will appear in view. Only the nodes that are connected to the focus nodes will be displayed. The level of connectedness can be configured to allow degrees of "connections of connections".

In conclusion, the present disclosure provides for novel systems, devices, and methods. While detailed descriptions of one or more embodiments have been given above, various alternatives, modifications, and equivalents will be apparent to those skilled in the art without varying from the spirit of the claims. Therefore, the above description should not be taken as limiting the scope of the inventions, which are defined by the appended claims.

What is claimed is:

1. A system for detecting webshell attacks, the system comprising:
    a processing resource;
    a non-transitory computer-readable medium, coupled to the processing resource, and having stored therein instructions that when executed by the processing resource cause the processing resource to:
        access a sensor log including recently gathered network sensor data;
        for a defined time partition of the network sensor data, generate at least a first current intermediate corresponding to a first intermediate of a first type and a second current intermediate corresponding to a second intermediate of a second type, wherein the first current intermediate is generated by performing a first series of analytics based upon the network sensor data for the defined time partition, and wherein the second current intermediate is generated by performing a second series of analytics based upon the network sensor data for the same defined time partition;
        store the first current intermediate as a current time partition of the first intermediate of the first type, wherein the first intermediate of the first type includes a plurality of time partitions each holding a first set of defined information included in the first intermediate of the first type;
        store the second current intermediate as a current time partition of the second intermediate of the second type, wherein the second intermediate of the second type includes a plurality of time partitions each holding a second set of defined information included in the second intermediate of the second type; and
        apply a webshell attack machine learning model to inputs derived from at least the first intermediate and the second intermediate to yield an observation, wherein the observation includes a likelihood of the occurrence of a webshell attack.

2. The system of claim 1, wherein the inputs derived from at least the first intermediate and the second intermediate include at least two of: a variability of size of a request to a webserver, a variability of size of a response from a webserver, time between access to a uniform resource identifier (URI) path of a webserver, size of a response from a webserver, and an indication that a request to a webserver is not from an obvious bot.

3. The system of claim 1, wherein the inputs derived from at least the first intermediate and the second intermediate include inputs from multiple partitions of the first intermediate.

4. The system of claim 3, wherein the network sensor data used to generate at least one of the multiple partitions of the first intermediate is not accessible to the processing resource at the time the first current intermediate is generated.

5. The system of claim 3, wherein the non-transitory computer-readable further having stored therein instructions that when executed by the processing resource cause the processing resource to:
generate at least a third current intermediate corresponding to a third intermediate of a third type, wherein the third current intermediate is generated by performing a third series of analytics based upon the network sensor data and at least one of the plurality of time partitions included in the first intermediate of the first type, wherein the network sensor data corresponding to the at least one of the plurality of time partitions included in the first intermediate of the first type is not used.

6. The system of claim 1, wherein the sensor data is gathered by a network element remote from the processing resource.

7. The system of claim 6, wherein the network element is associated with a local network, and wherein the sensor data corresponds to network traffic of the local network.

8. The system of claim 1, wherein the defined time partition is one hour, and wherein the plurality of time partitions each holding the first set of defined information included in the first intermediate of the first type are successive one hour time partitions representing a subset of the history of the network sensor data.

9. The system of claim 1, wherein generating the first current intermediate corresponding to the first intermediate of the first type is further based upon at least one of: context data corresponding to the network sensor data for the defined time partition, and the second intermediate of the second type.

10. A method for detecting a complex attack on a network infrastructure, the method comprising:
accessing, by a processing resource, a sensor log including recently gathered network sensor data;
for a defined time partition of the network sensor data, generating, by the processing resource, at least a first current intermediate corresponding to a first intermediate of a first type and a second current intermediate corresponding to a second intermediate of a second type, wherein the first current intermediate is generated by performing a first series of analytics based upon the network sensor data for the defined time partition, and wherein the second current intermediate is generated by performing a second series of analytics based upon the network sensor data for the same defined time partition;
storing, by the processing resource, the first current intermediate as a current time partition of the first intermediate of the first type, wherein the first intermediate of the first type includes a plurality of time partitions each holding a first set of defined information included in the first intermediate of the first type;
storing, by the processing resource, the second current intermediate as a current time partition of the second intermediate of the second type, wherein the second intermediate of the second type includes a plurality of time partitions each holding a second set of defined information included in the second intermediate of the second type; and
applying, by the processing resource, a complex attack machine learning model to inputs derived from at least the first intermediate and the second intermediate to yield an observation, wherein the observation includes a likelihood of a detection of a complex attack.

11. The method of claim 10, wherein the inputs derived from at least the first intermediate and the second intermediate include inputs from multiple partitions of the first intermediate.

12. The method of claim 11, wherein the network sensor data used to generate at least one of the multiple partitions of the first intermediate is not accessible to the processing resource at the time the first current intermediate is generated.

13. The method of claim 11, the method further comprising:
generating, by the processing resource, at least a third current intermediate corresponding to a third intermediate of a third type, wherein the third current intermediate is generated by performing a third series of analytics based upon the network sensor data and at least one of the plurality of time partitions included in the first intermediate of the first type, wherein the network sensor data corresponding to the at least one of the plurality of time partitions included in the first intermediate of the first type is not used.

14. The method of claim 10, wherein the sensor data is gathered by a network element remote from the processing resource.

15. The method of claim 14, wherein the network element is associated with a local network, and wherein the sensor data corresponds to network traffic of the local network.

16. The method of claim 14, the method further comprising:
communicating, by the processing resource, the observation to the network element.

17. The method of claim 10, wherein the plurality of time partitions each holding the first set of defined information included in the first intermediate of the first type are successive time partitions representing a subset of the history of the network sensor data.

18. The method of claim 10, wherein the defined time partition is one hour, and wherein the plurality of time partitions each holding the first set of defined information included in the first intermediate of the first type are successive one hour time partitions representing a subset of the history of the network sensor data.

19. The method of claim 10, wherein generating the first current intermediate corresponding to the first intermediate of the first type is further based upon context data corresponding to the network sensor data for the defined time partition.

20. The method of claim 10, wherein generating the first current intermediate corresponding to the first intermediate of the first type is further based upon the second intermediate of the second type.

21. The method of claim 10, wherein the complex attack is a webshell attack, and wherein the complex attack machine learning model is trained to detect a likelihood of a webshell attack.

22. The method of claim 21, wherein the inputs derived from at least the first intermediate and the second intermediate include at least two of: a variability of size of a request to a webserver, a variability of size of a response from a webserver, time between access to a uniform resource identifier (URI) path of a webserver, size of a response from a webserver, and an indication that a request to a webserver is not from an obvious bot.

23. A non-transitory computer-readable medium, the non-transitory computer readable medium having stored therein instructions that when executed by a processing resource cause the processing resource to perform a method comprising:

accessing a sensor log including recently gathered network sensor data, wherein the sensor data is gathered by a network element remote from the processing resource;

for a defined time partition of the network sensor data, generating at least a first current intermediate corresponding to a first intermediate of a first type and a second current intermediate corresponding to a second intermediate of a second type, wherein the first current intermediate is generated by performing a first series of analytics based upon the network sensor data for the defined time partition, and wherein the second current intermediate is generated by performing a second series of analytics based upon the network sensor data for the same defined time partition;

storing the first current intermediate as a current time partition of the first intermediate of the first type, wherein the first intermediate of the first type includes a plurality of time partitions each holding a first set of defined information included in the first intermediate of the first type;

storing the second current intermediate as a current time partition of the second intermediate of the second type, wherein the second intermediate of the second type includes a plurality of time partitions each holding a second set of defined information included in the second intermediate of the second type;

applying a webshell attack machine learning model to inputs derived from at least the first intermediate and the second intermediate to yield an observation, wherein the observation includes a likelihood of the occurrence of a webshell attack; and communicating the observation to the network element.

* * * * *